March 15, 1966 V. A. BUTLER ETAL 3,240,345
FILTER
Filed Feb. 6, 1963 2 Sheets-Sheet 1
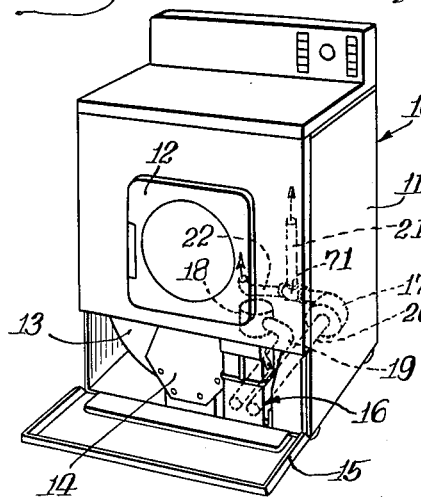
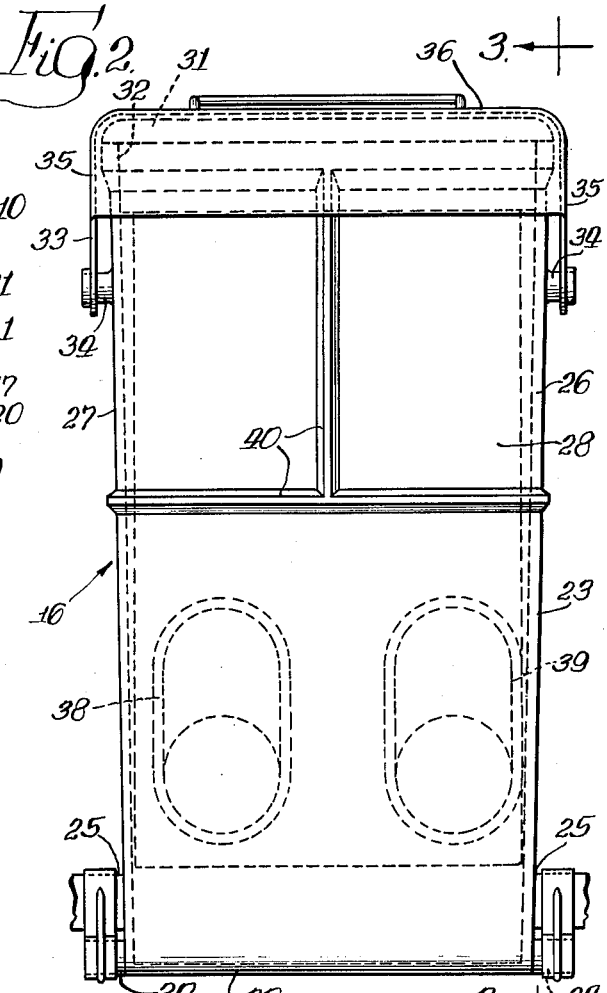
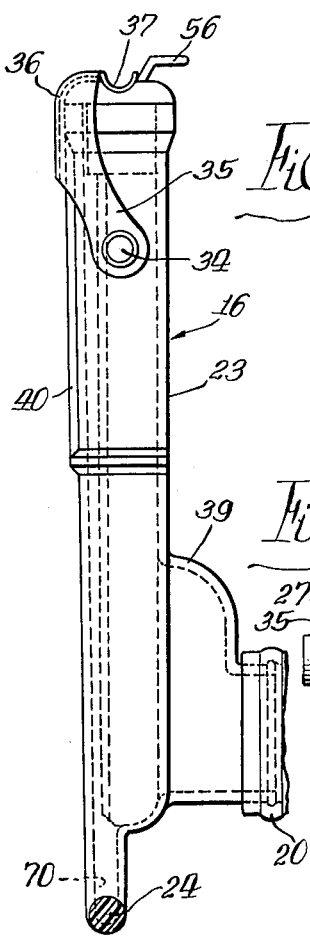
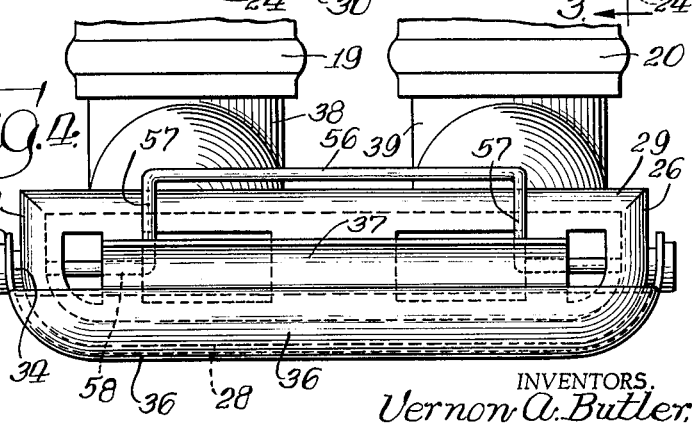
INVENTORS.
Vernon A. Butler,
BY Charles H. Wade,
Hofgren, Wegner, Allen,
Stellman & McCord Attys.

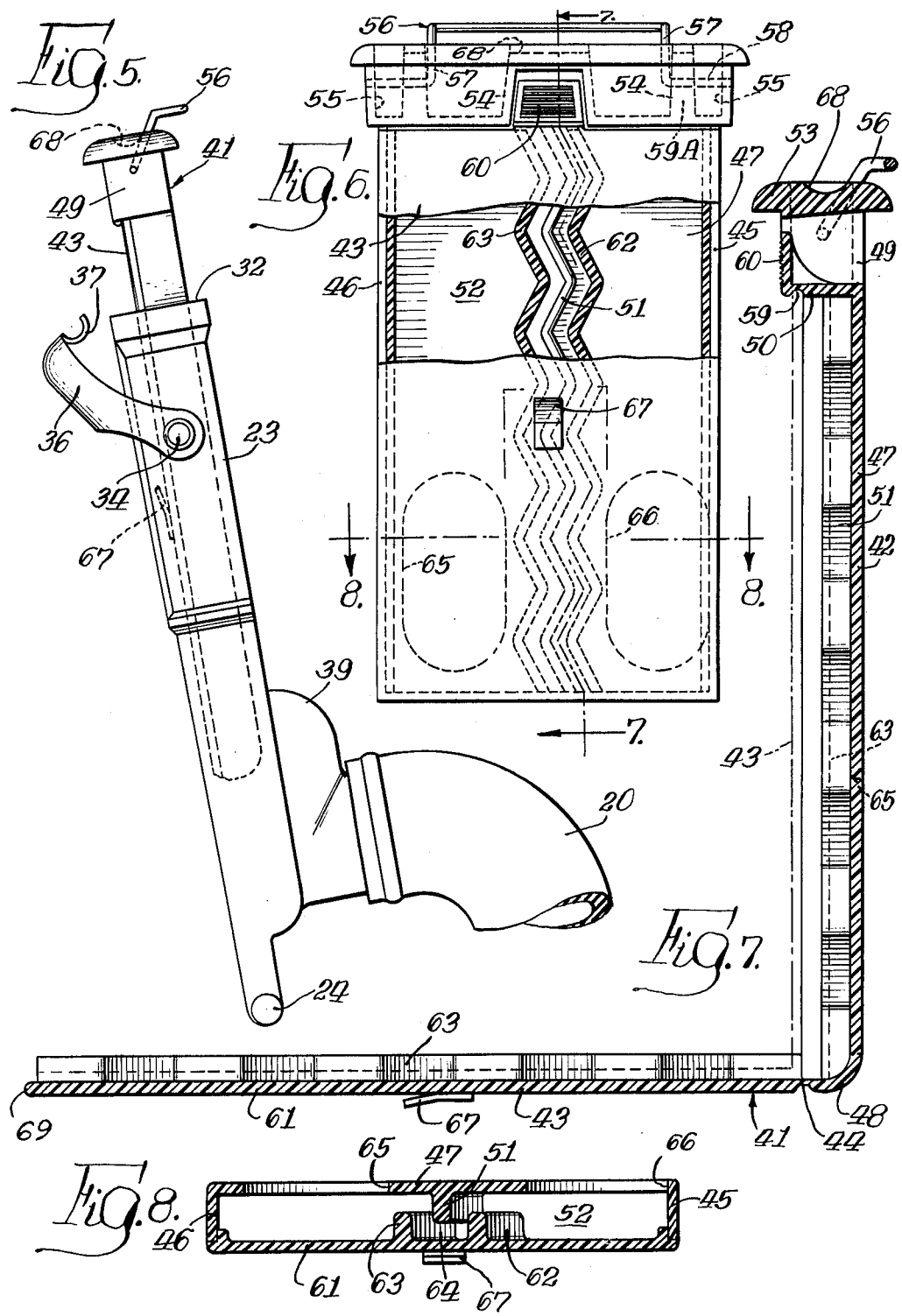

United States Patent Office 3,240,345
Patented Mar. 15, 1966

3,240,345
FILTER
Vernon A. Butler, St. Joseph, and Charles H. Wade, Benton Harbor, Mich., assignors to Whirlpool Corporation, a corporation of Delaware
Filed Feb. 6, 1963, Ser. No. 256,609
4 Claims. (Cl. 210—435)

This invention relates to laundry apparatus and in particular to filter means for use in such apparatus for removing foreign objects from the wash and rinse liquids used therein.

In the modern automatic laundry devices such as clothes washing machines, pumps are provided for circulating wash and rinse liquids during the laundering operation. Damage may occur to such pumps and other moving parts of the apparatus from items such as pins, nails, small plastic devices, golf tees and the like, if carried with the liquid into the pump or such moving parts, and, thus, it is highly desirable to provide some means in the apparatus for removing such foreign objects from the liquids to prevent such damage. The present invention comprehends an improved wash filter for such use in laundry apparatus.

Thus, a principal feature of the present invention is the provision of a new and improved wash filter.

A further feature of the invention is the provision of such a filter having a simple and economical construction providing effective positive removal of foreign objects from the wash liquids.

Another feature of the invention is the provision of such a filter arranged for facilitated removal of the collected objects therefrom.

Still another feature of the invention is the provision of such a filter including a filter element having hingedly connected portions permitting facilitated removal of the collected objects upon removal of the filter element from the apparatus and pivoting of the elements to an open position.

A yet further feature of the invention is the provision of such a filter having improved means for passing the washing liquid thereinto and therefrom.

Other features and advantages of the invention will be apparent from the following description taken in connection with the accompanying drawings wherein:

FIGURE 1 is a perspective view of a laundry apparatus having a filter embodying the invention;

FIGURE 2 is an enlarged front elevation of the filter;

FIGURE 3 is a vertical section taken substantially along the line 3—3 of FIGURE 2;

FIGURE 4 is a top plan view thereof;

FIGURE 5 is a view generally similar to that of FIGURE 3, but with the filter pivoted outwardly and the filter element disposed partially outwardly of the housing as during removal or installation;

FIGURE 6 is a front elevation of the filter element with a portion broken away to illustrate the internal construction thereof;

FIGURE 7 is a vertical section of the filter element taken substantially along the line 7—7 of FIGURE 6, but with the hinged portions pivoted to an open position; and FIGURE 8 is a transverse section taken substantially along the line 8—8 of FIGURE 6.

In the exemplary embodiment of the invention as disclosed in the drawing, a laundry apparatus generally designated 10 is shown to comprise a washer-dryer combination apparatus having a cabinet 11 provided with a door 12 providing controlled access to a cylindrical tank 13 in which fabric material, such as clothing, may be washed and dried. The tank may be carried on a suitable support 14 in the lower portion of the cabinet 11. Access to the lower portion of the cabinet may be provided by a suitable toe plate 15 hingedly connected to the cabinet to be pivoted to a lower position, as shown in FIGURE 1 when desired. The present invention comprehends the provision in apparatus 10 of an improved filter generally designated 16 which, as shown in FIGURE 1, may be disposed in the lower portion of the cabinet 11 adjacent the support 14, whereby ready access may be had to the filter when desired. The filter is connected in the liquid flow system of the apparatus 10 which includes a conventional pump 17 and a sump 18. The laundry liquids are delivered from the sump 18 through a flexible conduit 19 to the filter 16 and from the filter through a flexible conduit 20 to the pump 17. The washing liquids may be delivered from the pump selectively by means of a two way valve 71 through a return conduit 21 to the tank 13 or through a conduit 22 to a suitable drain.

As indicated briefly above, the present invention comprehends an improved filter construction arranged to remove from the washing liquid foreign objects and lint material. The filter is further arranged for facilitated removal therefrom of the collected objects and material. More specifically, the filter includes a housing 23 having a pair of laterally projecting bosses 24 rotatably mounted in a pair of pivot supports 25 carried on the cabinet 11. The housing 23 comprises a hollow member formed of a suitable material, such as a plastic, and includes side walls 26 and 27, a front wall 28, a rear wall 29, and a bottom wall 30. The upper end 31 of the housing 23 defines an opening 32. A bail latch 33 is mounted on the housing adjacent the upper end 31 by means of a pair of pivot posts 34 projecting laterally from the side walls 26 and 27 and pivotally carrying a pair of leg portions 35 of the bail latch. The bight 36 of the bail latch is provided with an arcuate catch portion 37, as best seen in FIGURE 3.

Conduit 19 is connected to the housing 23 through "bubble" type inlet 38, and conduit 20 is connected to the housing 23 through a "bubble" type outlet 39, as shown in FIGURES 2, 3 and 4. As shown in FIGURE 2, the inlet 38 and outlet 39 are disposed on opposite sides of the vertical center line of the housing adjacent the bottom and side walls 30. The front and side walls may further be provided with outwardly projecting reinforcing ribs 40 for strengthening the housing, as best seen in FIGURE 2.

Referring now more specifically to FIGURES 4 through 8, the filter 16 further includes a filter element generally designated 41 which is removably installed in the housing 23 through the opening 32. As best seen in FIGURE 7, the filter element 41 includes a pair of portions 42 and 43 connected by a hinge portion 44. In the illustrated embodiment, the filter element 41 is formed of a plastic material, and the hinge element 44 is formed integrally therein. Filter element portion 42 comprises a box-like member having side walls 45 and 46, a rear wall 47, a bottom wall 48 and an upper end portion 49 defining an end wall 50. The rear wall 47 is provided with a serpentine rib 51 which extends fully from bottom wall 48 to top wall 50, and partially across the space 52 within the filter member defined by the portions 42 and 43 when they are in the closed position illustrated in FIGURE 8. Upper end 49 of portion 42 includes an outer enlarged stop portion 53 adapted to seat on the end 31 of the housing 23. The end portion is further provided with an inner pair of upwardly opening recesses 54 and an outer pair of smaller upwardly opening recesses 55, as best seen in FIGURE 6. A wire handle 56 is connected to the end portion, as shown in FIGURE 6, the handle 56 comprising a U-shaped member having leg portions 57 extending into recesses 54 and outturned end portions 58 projecting through the portion 59a of the outer end 49 between recesses 54 and 55 to permit pivotal movement of the handle about the axis of the end portions 58. The end wall 50 is provided with a downwardly opening groove 59 adjacent an outwardly serrated front wall portion 60 of end portion 49.

The end portion 49, as best seen in FIGURE 5, is adapted to be received in the end 32 of housing 23 for closing the opening 32. When installed in the housing 23, the filter element portion 43 is disposed in a closed position, as shown in FIGURE 5. The portion 43 includes a front wall 61 and a pair of serpentine ribs 62 and 63 projecting rearwardly from wall 61 to extend parallel to rib 51 of filter element portion 42, as best seen in FIGURE 6. As shown in FIGURES 6 and 8, the ribs 62 and 63 extend the length of wall 61 and partially across the space 52 to define, within rib 51 of filter element portion 42, a tortuous flow path 64 for the washing liquids flowing through the space 52.

The washing liquid passes through the space 52 from an inlet opening 65 in rear wall 47 of filter element portion 42 to an outlet opening 66 in wall 47, the openings 65 and 66 being disposed on opposite sides of the vertical center line of the filter element portion 42 respectively adjacent side walls 46 and 45. The openings 65 and 66 are vertically elongated, as shown in FIGURE 6, to correspond to the vertical elongate openings 38 and 39 in the housing 23, and a spring 67 is provided on the front portion 43 of the filter element 41 to bear against front wall 28 of housing 23 and urge the filter element rearwardly against the rear wall 29 of the housing 23 when the filter element is installed therein. Thus, washing liquid passes from inlet 38 through opening 65 into filter element space 52. The washing liquid then passes through the tortuous passage 64 defined by the juxtaposed ribs 63, 51 and 62 which effectively define baffles for removing from the washing liquid foreign material and objects, and thereby prevent passage of such material and objects to the outlet opening 66. The filtered washing liquid then passes through opening 66 and outlet opening 39 to the conduit 20 for delivery to the pump 17. The filter element 41 is retained within the housing 23 by the arcuate retainer 37, as shown in FIGURE 3, which releasably seats in an arcuate recess 68 in the end wall 53 when the filter element 41 is fully installed in the housing 23 and the retainer is swung on pivot 34 from the position of FIGURE 5 to the position of FIGURE 3. The retaining action is effectively positive as the arcuate retainer is longitudinally aligned with the pivot axis 34 relative to the direction of movement of the filter element 41 outwardly from the housing 23. However, when it is desired to move the filter element from the housing the user merely swings the handle 56 forwardly about the axis of end portions 58 thereof causing the legs 57 to bear against the retainer portion 37 and urge it forwardly outwardly from the arcuate recess 68 and from the path of movement of the filter element from the housing. To facilitate the removal of the filter element from the housing the entire filter unit 16 may be swung about the axis of pivots 24, as shown in FIGURE 5, so as to provide access to the handle 56 and the upper portion 49 of the filter element. The swinging of the filter unit 16 to facilitate the removal of the filter element may also be accomplished by a linkage (not shown) between the toe plate 15 and the filter unit 16 so that the filter unit will automatically be pivoted to its accessible position when the toe plate 15 is pivoted to its lower position.

The filter element is readily cleaned by urging the portion 43 away from portion 42 against the retaining action of the end 69 of wall 61 in groove 59, as shown in dotted lines in FIGURE 7. This provides full clear access to the interior of the filter element and permits objects removed from the wash liquid and retained by the baffle ribs 63, 51, and 62 to be removed from the filter element as by turning the element upside down. Objects which may have become wedged between the ribs may be readily removed as by tapping the filter element in the opened position. The interior of the filter element may be readily flushed with water from a conventional sink tap to thoroughly clean the same.

To reinstall the filter element in filter 16, the user merely recloses the filter element by pivoting portion 43 to re-engage wall end 69 with wall 50 in groove 59 and permit reinstallation of the filter element in the housing 23 by an endwise movement thereof through opening 32, as shown in FIGURE 5. The retainer 37 is urged rearwardly to engage groove 68, as shown in FIGURE 3, to complete the reinstallation and positively retain the filter element within the housing. The filter 16 may then be pivoted rearwardly to the position of FIGURE 3, whereupon the toe plate 15 may be swung upwardly to close the lower portion of the cabinet 11 and complete the maintenance operation. The filter housing sump 70 provides a clearance area for small objects that may fall into housing 23 when filter element 41 is removed for cleaning, thereby permitting the reinstallation of filter element 41 in the housing 23 without obstruction.

The filter housing 23 and element 41 may be economically formed of a suitable plastic, such as polypropylene or nylon. The structure of filter 16 is extremely simple and economical yet provides long trouble-free life. The maintenance of filter 16 is extremely simple as discussed above. The functioning of the filter is effectively positive and permits long trouble-free life of the pump and associated mechanism of the laundry apparatus.

While we have shown and described one embodiment of our invention, it is to be understood that it is capable of many modifications. Changes, therefore, in the construction and arrangement may be made without departing from the spirit and scope of the invention as defined in the appended claims.

We claim:

1. A filter comprising: a housing having front, back, side and bottom walls defining a space, said housing having an open top and further defining spaced apart inlet and outlet openings; and a filter element formed of a plastic material, said filter element being removably fitted in said housing space and having front, back, side and bottom walls, corresponding respectively to said housing front, back, side and bottoms walls, defining a filter chamber, said filter element defining inlet and outlet openings respectively in registry with said inlet and outlet openings of said housing for conducting fluid to be filtered in a flow path extending from said inlet opening of the filter element, through the filter chamber to said outlet opening of the filter chamber, a first rib extending serpentinely transversely across said chamber substantially between said side walls from said front wall of said filter element to adjacent said back wall thereof and intermediate said inlet and outlet openings of the filter element, a second rib extending serpentinely transversely across said chamber substantially between said side walls from said back wall of said filter element to adjacent said front wall thereof and intermediate said inlet and outlet openings of said filter element, said ribs being closely spaced apart in said direction of flow, the cumulative extension of said ribs between said front and back walls being slightly greater than the spacing between said front and back walls whereby said serpentine ribs have overlapping distal portions, said ribs being constructed to define therebetween in said chamber a continuous series of flow path portions extending laterally across said flow path, each flow path portion having a preselected small maximum extent in a direction laterally of the flow path and a preselected small maximum extent in the direction of the flow path for precluding passage of objects therethrough.

2. The filter of claim 1 wherein said housing inlet and outlet openings are elongated in a direction between said open top and bottom wall of the housing and said filter element openings are correspondingly elongated.

3. The filter of claim 1 wherein said filter element extends only partially into said space to define between said filter element and said housing a sump portion at an inner end of said space.

4. The filter of claim 1 including a third rib extending serpentinely transversely across said chamber substantially between said side walls from said front wall of said filter element to adjacent said back wall thereof and intermediate said inlet and outlet openings of the filter element, said second and third ribs having overlapping distal portions.

References Cited by the Examiner

UNITED STATES PATENTS

| | | | |
|---|---|---|---|
| 960,374 | 6/1910 | Muchke | 55—44 X |
| 1,521,262 | 12/1924 | Wainwright | 55—442 |
| 1,849,290 | 3/1932 | Goldstein | 55—440 |
| 2,057,497 | 10/1936 | NcNeal | 210—392 |
| 2,279,656 | 4/1942 | Chamberlin et al. | 68—24 X |
| 2,343,743 | 3/1944 | Breckenridge | 68—24 X |
| 2,352,363 | 6/1944 | Bassett | 68—24 |
| 2,369,915 | 2/1945 | Quinn | 210—232 |
| 2,426,078 | 8/1947 | Bassett | 68—24 X |
| 2,548,568 | 4/1951 | Swank | 210—307 |
| 2,603,588 | 7/1952 | Vaughn et al. | 210—84 X |
| 2,976,954 | 3/1961 | Irwin | 55—442 X |
| 2,997,131 | 8/1961 | Fisher | 55—308 X |
| 3,075,336 | 1/1963 | Hays | 55—442 |

REUBEN FRIEDMAN, *Primary Examiner.*

ROBERT F. BURNETT, *Examiner.*